United States Patent
Fujinami et al.

[15] 3,668,217
[45] June 6, 1972

[54] 3-(3',5'-DIHALOGENOPHEN-YL)IMIDAZOLIDINE-2,4-DIONE DERIVATIVES

[72] Inventors: Akira Fujinami, Ashiya-shi; Toshiaki Ozaki, Toyonaka-shi; Fukashi Horiuchi, Saitama-ken; Sigeo Yamamoto, Toyonaka-shi; Keiichiro Akiba, Ikeda-shi; Katsutoshi Tanaka, Takarazuka-shi; Shigehiro Ooba, Takarazuka-shi; Tadashi Ooishi, Minoo-shi; Katsuji Nodera, Nishinomiya-shi; Nobuyuki Kameda, Takarazuka-shi, all of Japan

[73] Assignee: Sumitomo Chemical Company, Ltd., Osaka, Japan

[22] Filed: Nov. 14, 1969

[21] Appl. No.: 876,987

[30] Foreign Application Priority Data

Nov. 25, 1968 Japan..................................43/86483
May 13, 1969 Japan..................................44/37160

[52] U.S. Cl. ....................260/309.5, 260/465 D, 260/470, 260/471 R, 260/516, 260/518 R, 424/273
[51] Int. Cl. .............................................C07d 47/32
[58] Field of Search................................260/309.5

[56] References Cited

UNITED STATES PATENTS

3,134,663  5/1964  Kroll...................260/309.5

FOREIGN PATENTS OR APPLICATIONS

1,018,261  10/1957  Germany................260/309.5
1,032,258   6/1958  Germany................260/309.5
  629,779  10/1963  Belgium.................260/309.5

OTHER PUBLICATIONS

Lombardino et al., J. Med. Chem. Vol. 7, pages 97–101 (1964). R51.J5
Paul et al., Chem. Abst. Vol. 53, columns 22729–22730 (1959). QD1.A51

*Primary Examiner*—Natalie Trousof
*Attorney*—Stevens, Davis, Miller & Mosher

[57] ABSTRACT

3-(3',5'-Dihalogenophenyl)imidazolidine-2,4-dione derivatives, which may be substituted with alkyl or phenyl in the 1 and/or 5 positions, are new compounds, and have high microbicidal activity on various fungi and bacteria and are non-toxic to plants and mammals. Those compounds are prepared by the intramolecular cyclization of a corresponding urea derivatives.

9 Claims, No Drawings

3-(3',5'-DIHALOGENOPHENYL)IMIDAZOLIDINE-2,4-DIONE DERIVATIVES

The present invention is concerned with 3-(3',5'-dihalogenophenyl) imidazolidine-2,4-dione derivatives having microbicidal activities which are represented by the formula,

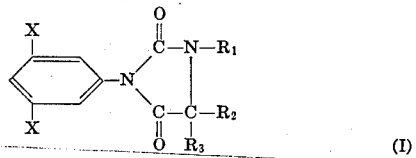

wherein X is a halogen atom; $R_1$ is hydrogen atom, an alkyl group having one to five carbon atoms, or a phenyl group; $R_2$ is hydrogen atom, an alkyl group having one to six carbon atoms which may be substituted with methylmercapto group, phenyl group or benzyl group; and $R_3$ is hydrogen atom, an alkyl group having one to six carbon atoms, or phenyl group; a process for preparing said derivatives; and novel fungicides containing said derivatives as active ingredients.

The novel compounds of the present invention which represented by the formula (I) can be easily prepared by intramolecularly cyclizing at an elevated temperature in the presence of an acid catalyst a urea derivative represented by the formula,

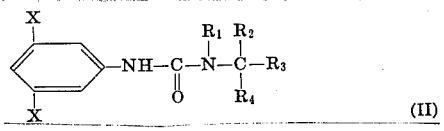

wherein X, $R_1$, $R_2$ and $R_3$ are as defined previously, and $R_4$ is carboxyl group, a lower alkoxycarbonyl group or cyano group.

Some 3-phenylimidazolidine-2,4-dione derivatives have been known as compounds, among which there are those having herbicidal activities. However, all the present compounds are novel and have no detrimental action on plants at all, and it has been found that they have strong and extremely broad microbicidal activities which have never been expected from other homologous compounds.

That is, there has been attained such a surprising novel knowledge that only in the case where halogen atoms have simultaneously been substituted in the 3- and 5-positions of the benzene ring attached to the nitrogen atom of the imide moiety of a 3-phenylimidazolidine-2,4-dione derivative, does the said derivative display physiological activities entirely different from those of other homologous compounds, i.e., strong and broad fungicidal activities, and it has no detrimental action on plants at all.

The present compounds have prominent effects on such a wide scope of fungi as Blast, Sheath blight, Helminthosporium leaf spot and bacterium as Bacterial leaf blight of rice plants/and fungi as Sclerotinia rot, Powdery mildew, brown rot, Black spot, Alternaria leaf spot, gray mold, Blossom blight, Canker and Damping-off of vegetables and fruits of agricultural and horticultural crops. Moreover, they not only have no detrimental action on useful plants and fishes but also are entirely free from toxicity to mammals, unlike mercury or arsenic preparations, and hence are quite excellent as plant pathogenic microbe-controlling agents. In addition, the present compounds can effectively control *Aspergillus niger* which propagates in industrial products, etc.

An object of the present invention is to provide the above-mentioned novel compounds.

Another object is to provide novel and useful microbicides.

Other objects will become apparent from the following description.

The present compound of the formula (I) can be easily prepared by heating the urea derivative of the formula (II) in the presence of an acid catalyst such as hydrochloric acid, sulfuric acid and phosphoric acid, under reflux.

The reaction is almost completed within 3 hrs.

Typical examples of the compounds represented by the formula (1), which are provided in accordance with the present invention, are as follows:

3-(3',5'-dichlorophenyl) imidazolidine-2,4-dione
3-(3',5'-dichlorophenyl)-5-methylimidazolidine-2,4-dione
3-(3',5'-dichlorophenyl)-5-isobutylimidazolidine-2,4-dione
3-(3',5'-dichlorophenyl)-5-hexylimidazolidine-2,4-dione
3-(3',5'-dichlorophenyl)-5-(2-methylmercapto)ethylimidazolidine-2,4-dione
3-(3',5'-dichlorophenyl)-5-benzylimidazolidine-2,4-dione
3-(3',5'-dichlorophenyl)-1-methylimidazolidine-2,4-dione
3-(3',5'-dichlorophenyl)-1-ethylimidazolidine-2,4-dione
3-(3',5'-dichlorophenyl)-1-isopropylimidazolidine-2,4-dione
3-(3',5'-dichlorophenyl)-5,5-dimethylimidazolidine-2,4-dione
3-(3',5'-dichlorophenyl)-1-methyl-5,5-dimethylimidazolidine-2,4-dione
3-(3',5'-dichlorophenyl)-5-phenylimidazolidine-2,4-dione
3-(3',5'-dichlorophenyl)-1-phenylimidazolidine-2,4-dione
3-(3',5'-dibromophenyl)-imidazolidine-2,4-dione
3-(3',5'-dibromophenyl)-5-phenylimidazolidine-2,4-dione In actual application as microbicides, the present compounds may be used in a pure form without incorporation of other ingredient, or, for easier application as microbicides, they may be mixed with carriers and formulated into any forms of common microbicides compositions e.g., dusts, wettable powders, oil sprays, aerosols, tablets, emulsifiable concentrates, granules, etc. Further, they may be used in admixture with other chemicals such as, for example, Blasticidin S, Kasugamycin, Polyoxin, pentachlorobenzaldoxime, γ-1,2,3,4,5,6-hexachlorocyclohexane, N-(3',5'-dichlorophenyl) maleimide, N-(3',5'-dichlorophenyl) succinimide, N-(3,5-dichlorophenyl) itaconimide, O,O-diethyl-S-benzyl phosphorothioate, O-ethyl-S,S-diphenyl phosphorodithioate, O-butyl-S-benzyl-S-ethyl phosphorodithioate, O-ethyl-O-phenyl-O-(2,4,5-trichlorophenyl) phosphate, O,O-dimethyl-O-(3-methyl-4-nitrophenyl) phosphorothioate, S-[1,2-bis(ethoxycarbonyl) ethyl]-O,O-dimethyl phosphorodithioate, O,O-dimethyl-S-(N-methylcarbamoyl methyl) phosphorodithioate, O,O-diethyl-O-(2-isopropyl-6-methyl-4-pyrimidinyl) thiophosphate, 3,4-dimethylphenyl-N-methyl carbamate, zinc ethylenebis dithiocarbamate, N-trichloromethylthio-4-cyclohexene-1,2-dicarboximide, N-(1,1,2,2-tetrachloroethylthio)-4-cyclohexene-1,2-dicarboximide, iron methylarsonate, 1-(N-n-butylcarbamoyl)-2-methoxycarbonyl aminobenzimidazole, etc. and, in every case, no controlling effects of individual chemicals are decreased. Accordingly, simultaneous control of two or more diseases and/or injurious insects is possible and synergistic effects due to the mixing can be expected. In addition, the present compounds may be used in admixture with such agricultural chemicals as herbicides, nematocides, miticides, etc. or with fertilizers.

The present invention is illustrated in further detail below. It is, however, needless to say that the kinds of starting materials for the present compounds, the reaction conditions and the kinds and mixing proportions of additives to be incorporated into the present compounds are not limited only to those set forth in the examples but are variable over a wide scope.

EXAMPLE 1

Preparation process:

a. Standard operational process.

0.1 mole of a urea derivative represented by the formula (II) and 50 g. of 20 percent hydrochloric acid are mixed in a 100 ml. four-necked flask, and the mixture is stirred with reflux for 2 hours. After completion of the reaction, a deposited crystal is recovered by filtration, is washed several times with water and is dried, whereby a desired 3-(3',5'-dihalogenophenyl) imidazolidine-2,4-dione derivative is obtained in a favorable yield. If necessary, the derivative may be recrystallized from ethanol-water to obtain the desired product higher in purity.

b. The urea derivatives represented by the formula (II), which are used in the present process, can be easily obtained by reacting, according to ordinary procedure, 3,5-dihalogenophenyl isocyanates with corresponding amines. Typical examples of the phenyl isocyanates and amines are as shown below, but it is needless to say that the scope of the present invention is not limited thereby.
Names of compounds:
1. Phenyl isocyanates:
 3,5-difluorophenyl isocyanate
 3,5-dichlorophenyl isocyanate
 3,5-dibromophenyl isocyanate
 3,5-diiodophenyl isocyanate
2. Amines:
 glycine
 N-methylglycine
 N-ethylglycine
 N-n-propylglycine
 N-methylglycine ethyl ester
 glycine ethyl ester
 glycine-n-butyl ester
 aminoacetonitrile
 N-n-propylaminoacetonitrile
 α-aminopropionitrile
 alanine
 N-methylalanine
 N-methyl-α-methylalanine
 N-ethylalanine
 alanine ethyl ester
 N-benzylalanine ethyl ester
 N-benzyl-α-methylalanine ethyl ester
 N-phenyl-α-methylphenylalanine
 glutamic acid
 ethyl N-methylglutamate
 α-aminopropionitrile
 α-methylaminopropionitrile
 α-amino-n-butyric acid
 α-benzylamino-n-butyric acid
 ethyl α-amino-n-butyrate
 α-amino-n-butyronitrile
 α-isopropylamino-n-butyronitrile
 α-amino-isobutyric acid
 ethyl α-amino-isobutyrate
 ethyl α-methylamino-α-ethyl-isobutyrate
 α-amino-isobutyronitrile
 valine
 N-phenylvaline
 α-methylvaline
 N-methyl-α-methylnorvaline
 norvaline ethyl ester
 α-amino-n-valeronitrile
 α-isopropylamino-n-valeronitrile
 leucine
 N-n-propyl isoleucine
 leucine ethyl ester
 α-amino-isocapronitrile
 isoleucine
 N-ethyl isoleucine
 isoleucine ethyl ester
 norleucine
 N-benzyl-α-methylnorleucine
 norleucine ethyl ester
 α-amino-n-capronitrile
 α-methylamino-n-capronitrile
 α-amino-n-caprylic acid
 ethyl α-isopropylamino-n-caprylate
 α-ethylamino-n-capronitrile
 phenylalanine
 phenylalanine ethyl ester
 N-phenyl phenylalanine
 α-amino-β-phenylpropionitrile
c. The present compounds were synthesized according to the above-mentioned preparation process to obtain the results set forth in Table 1.

EXAMPLE 2

Preparation of microbicidal compositions:

The compounds employed in this example are represented by the numbers of the compounds set forth in Table 1 of the preceding Example 1.

A. Dusts:

3 parts of each of the compounds (1) and (12) and 97 parts of clay were thoroughly pulverized and mixed together to obtain 2 kinds of dusts containing, individually, 3 percent of active ingredient. In application, the dusts were dusted as they were.

B. Dusts:

4 parts of each of the compounds (4) and (13) and 96 parts of talc were thoroughly pulverized and mixed together to obtain 2 kinds of dusts containing, individually, 4 percent of active ingredient. In application, the dusts were dusted as they were.

C. Wettable powders:

50 parts of each of the compounds (6) and (14), 5 parts of a wetting agent of alkylbenzenesulfonate and 45 parts of diatomaceous earth were thoroughly pulverized and mixed together to obtain 2 kinds of wettable powders containing, individually, 50 percent of active ingredient. In application, the wettable powders were diluted with water and the solutions were sprayed.

D. Emulsifiable concentrates:

10 parts of each of the compounds (10) and (15), 80 parts of dimethyl sulfoxide and 10 parts of an emulsifier of polyoxyethylene phenylphenol ether were mixed together to obtain 2 kinds of emulsifiable concentrates containing, individually, 10 percent of active ingredient. In application, the emulsifiable concentrates were diluted with water and the emulsions were sprayed.

E. Granules:

5 parts of each of the compounds (7) and (16), 93.5 parts of clay and 1.5 parts of a binder of polyvinyl alcohol were thoroughly pulverized and mixed together, kneaded with water and then granulated and dried to obtain 2 kinds of granules containing, individually, 5 percent of active ingredient.

F. Composite dusts:

2 parts of each of the compounds (1) and (14), 1.5 of 0-n-butyl-S-ethyl-S-benzylphosphorodithiolate, 0.1 part of Kasugamycin and 96.4 parts of clay were thoroughly pulverized and mixed together to obtain two kinds of dusts containing, individually, 3.6 percent of active ingredients. In application, the dusts were dusted as they were.

G. Composite dusts:

2 parts of each of the compounds (4) and (18), 1.5 parts of 0-n-butyl-S-ethyl-S-benzylphosphorodithiolate, 2 parts of 0,0-dimethyl-0-(3-methyl-4-nitrophenyl) phosphorothioate, 1.5 parts of 3,4-dimethylphenyl-N-methylcarbamate and 93 parts of clay were thoroughly pulverized and mixed together to obtain 2 kinds of dusts containing, individually, 7 percent of active ingredients. In application, the dusts were dusted as they were.

EXAMPLE 3

Typical test results of the present compounds are shown below with reference to test examples in order to substantiate the facts that the characteristic physiological activities of the present compounds are observed only in the case where a 3,5-dihalogenophenyl group has been substituted in the nitrogen atom of the imide body, and no such activities are observed at all in the case where other phenyl group has been substituted therein: and that the present compounds have strong and broad microbicidal effects which have never been seen in the conventional fungicides.

TEST EXAMPLE 1

Effects of controlling rice blast:

Rice plants (variety: WASEASAHI), which had been cultivated to the 3 leaves stage in flower pots of 9 cm. in diameter, were sprayed with 7 ml. per pot of each of aqueous solutions of test compounds in the form of emulsifiable concentrates. After one day, the plants were sprayed to inoculate with a spore suspension of rice blast fungus (*Pyricularia oryzae*). 5 days thereafter, the number of diseased spots generated was counted to investigate the fungicidal effects of individual test compounds. This test was carried out on different days to obtain the results as set forth in Tables 2 and 3. As is clear from Tables 2 and 3, the present compounds showed markedly excellent results as compared with the control known compounds.

TABLE 1

3-(3',5'-dihalogenophenyl) imidazolidine-2,4-dione derivative obtained

| Number | Urea derivative employed | Structure and name of compound | Yield (percent) | Melting point (°C.) | Elementary analysis values (percent) | | | | | | | |
|---|---|---|---|---|---|---|---|---|---|---|---|---|
| | | | | | Calculated | | | | Found | | | |
| | | | | | C | H | N | Cl | C | H | N | Cl |
| 1 | Cl—⟨phenyl(Cl)⟩—NHCNHCH₂COOH, C=O | 3-(3',5'-dichlorophenyl) imidazolidine-2,4-dione. | 92 | 194–195 | 44.11 | 2.47 | 11.43 | 28.94 | 43.96 | 2.65 | 11.23 | 28.99 |
| 2 | Cl—⟨phenyl(Cl)⟩—NHCNHCH₂CN, C=O | Same as above | 83 | 193–195 | 44.11 | 2.47 | 11.43 | 28.94 | 44.27 | 2.58 | 11.18 | 29.05 |
| 3 | Cl—⟨phenyl(Cl)⟩—NHCNHCH₂COOC₂H₅, C=O | Same as above | 85 | 194–195 | 44.11 | 2.47 | 11.43 | 28.94 | 43.84 | 2.46 | 11.59 | 28.91 |
| 4 | Cl—⟨phenyl(Cl)⟩—NHCNHCHCOOH (CH₃), C=O | 3-(3',5'-dichlorophenyl)-5-methyl-imidazolidine-2,4-dione. | 94 | 158.5–159.5 | 46.36 | 3.11 | 10.81 | 27.37 | 46.43 | 2.91 | 10.81 | 27.23 |
| 5 | Cl—⟨phenyl(Cl)⟩—NHCNHCHCN (CH₃), C=O | Same as above | 90 | 159–160 | 46.36 | 3.11 | 10.81 | 27.37 | 46.51 | 3.02 | 10.94 | 27.66 |
| 6 | Cl—⟨phenyl(Cl)⟩—NHCNHCHCOOH (CH₂CH(CH₃)₂), C=O | 3-(3',5'-dichlorophenyl)-5-isobutylimidazolidine-2,4-dione. | 91 | 149–150 | 51.84 | 4.69 | 9.30 | 23.54 | 51.61 | 4.49 | 9.29 | 23.41 |

TABLE 1 — Continued 3-(3',5'-dihalogenophenyl) imidazolidine-2,4-dione derivative obtained

| Number | Urea derivative employed | Structure and name of compound | Yield (percent) | Melting point (°C.) | Calculated C | Calculated H | Calculated N | Calculated Cl | Found C | Found H | Found N | Found Cl |
|---|---|---|---|---|---|---|---|---|---|---|---|---|
| 7 | NHCNHCHCOOH / O / (CH₂)₅CH₃ (on 3,5-dichlorophenyl) | 3-(3',5'-dichlorophenyl)-5-hexylimidazolidine-2,4-dione. | 87 | 121–123 | 54.72 | 5.51 | 8.51 | 21.54 | 54.36 | 5.53 | 8.68 | 21.41 |
| 8 | NHCNHCHCOOH / O / (CH₂)₂SCH₃ (on 3,5-dichlorophenyl) | 3-(3',5'-dichlorophenyl)-5-methylthioethylimidazolidine-2,4-dione. | 75 | 127–128.5 | 45.15 | 3.70 | 8.78 | 22.21 | 45.11 | 3.83 | 8.66 | 22.31 |
| 9 | NHCNHCH(CH₂)₂SCH₃ / O / CN (on 3,5-dichlorophenyl) | Same as above | 70 | 126.5–128 | 45.15 | 3.79 | 8.78 | 22.21 | 45.18 | 3.83 | 8.74 | 22.28 |
| 10 | NHCNHCHCOOH / O / CH₂—C₆H₅ (on 3,5-dichlorophenyl) | 3-(3',5'-dichlorophenyl)-5-benzylimidazolidine-2,4-dione. | 91 | 145.5–147 | 57.33 | 3.60 | 8.36 | 21.16 | 57.33 | 3.60 | 8.41 | 21.06 |
| 11 | NHCNHCHCOOC₂H₅ / O / CH₂—C₆H₅ (on 3,5-dichlorophenyl) | Same as above | 80 | 144–146 | 57.33 | 3.60 | 8.36 | 21.16 | 57.44 | 3.57 | 8.32 | 21.10 |

TABLE 1 — Continued 3-(3',5'-dihalogenophenyl) imidazolidine-2,4-dione derivative obtained

| Number | Urea derivative employed | Structure and name of compound | Yield (percent) | Melting point (°C.) | Calculated C | Calculated H | Calculated N | Calculated Cl | Found C | Found H | Found N | Found Cl |
|---|---|---|---|---|---|---|---|---|---|---|---|---|
| 12 | (structure with NHCN-CH₂CN, CH₃) | 3-(3',5'-dichlorophenyl)-1-methylimidazolidine-2,4-dione. | 87 | 200.5–201.5 | 46.36 | 3.11 | 10.81 | 27.37 | 46.28 | 3.00 | 10.60 | 27.18 |
| 13 | (structure with C₂H₅, NHC-N-CH₂COOC₂H₅) | 3-(3',5'-dichlorophenyl)-1-ethylimidazolidine-2,4-dione. | 91 | 66.5–68.5 | 48.37 | 3.69 | 10.26 | 25.96 | 48.04 | 3.61 | 10.09 | 26.28 |
| 14 | (structure with CH₃-CH-CH₃, NHCNCH₂COOH) | 3-(3',5'-dichlorophenyl)-1-isopropylimidazolidine-2,4-dione. | 90 | 102.0–103.5 | 50.19 | 4.21 | 9.76 | 24.70 | 50.04 | 4.09 | 9.53 | 24.40 |
| 15 | (structure with CH₃-C-CH₃, CN, NHCNH) | 3-(3',5'-dichlorophenyl)-5,5-dimethylimidazolidine-2,4-dione. | 93 | 166.0–167.5 | 48.37 | 3.69 | 10.26 | 25.96 | 48.14 | 3.71 | 10.16 | 25.81 |
| 16 | (structure with CH₃ CH₃, CH₃-C-CH₃, CN, NHC-N) | 3-(3',5'-dichlorophenyl)-5,5-dimethylimidazolidine-2,4-dione. | 92 | 156.5–157.5 | 50.19 | 4.21 | 9.76 | 24.70 | 50.04 | 4.09 | 9.53 | 24.40 |

TABLE 1 – Continued 3-(3',5'-dihalogenophenyl) imidazolidine-2,4-dione derivative obtained

| Number | Urea derivative employed | Structure and name of compound | Yield (percent) | Melting point (°C.) | Elementary analysis values (percent) | | | | | | | |
|---|---|---|---|---|---|---|---|---|---|---|---|---|
| | | | | | Calculated | | | | Found | | | |
| | | | | | C | H | N | Cl | C | H | N | Cl |
| 17 | (structure: NHCNHCH-COOC₂H₅ with 3,5-Cl₂-phenyl) | 3-(3',5'-dichlorophenyl)-1-methyl-5,5-dimethylimidazolidine-2,4-dione. | 84 | 197.0–198.0 | 56.10 | 3.14 | 8.72 | 22.08 | 55.96 | 2.94 | 8.48 | 22.13 |
| 18 | (structure: NHCNCH₂CN with phenyl and 3,5-Cl₂-phenyl) | 3-(3',5'-dichlorophenyl)-5-phenylimidazolidine-2,4-dione. | 89 | 235.5–238.0 | 56.09 | 3.14 | 8.72 | 22.08 | 55.87 | 3.34 | 8.66 | 22.11 |
| 19 | (structure: NHCNHCH₂COOH with 3,5-Br₂-phenyl) | 3-(3',5'-dibromophenyl)-1-phenylimidazolidine-2,4-dione. | 95 | 222.5–224.0 | 32.36 | 1.81 | 8.39 | (Br) 47.85 | 31.92 | 2.00 | 8.24 | (Br) 47.81 |
| 20 | (structure: NHCNHCHCOOH with phenyl and 3,5-Br₂-phenyl) | 3-(3',5'-dibromophenyl)-5-phenylimidazolidine-2,4-dione. | 83 | 217–218 | 43.93 | 2.46 | 6.83 | (Br) 38.97 | 44.15 | 2.20 | 6.75 | (Br) 39.38 |

TABLE 2

| Test compound | Active ingredient concentration (p.p.m.) | Number of spots per 10 leaves |
|---|---|---|
| 1-(3,5-dichlorophenyl)-3-methylenehydantoin derivative (Cl, Cl-phenyl-N with C=O–NH and C=O–CH₂ ring) | 500 | 19 |
| 1-(3,5-dichlorophenyl)-5-methylhydantoin (with CHCH₃) | 500 | 26 |
| 1-(3,5-dichlorophenyl)-5-benzylhydantoin (with CHCH₂–phenyl) | 500 | 24 |
| 1-(3-chlorophenyl) hydantoin* | 500 | 109 |
| Non-treatment | | 186 |

*Control known compound.

TABLE 3

| Test compound | Active ingredient concentration (p.p.m.) | Number of spots per leaf |
|---|---|---|
| 1-(3,5-dichlorophenyl)-3-methyl hydantoin (N–CH₃) | 1,000 | 4.8 |
| 1-(3,5-dichlorophenyl)-3-isopropyl hydantoin (N–CH(CH₃)₂) | 1,000 | 3.7 |
| 1-phenyl hydantoin* | 1,000 | 50.4 |
| 1-(3,4-dichlorophenyl)-3-isopropyl hydantoin* | 1,000 | 49.7 |
| Non-treatment | | 56.2 |

*Control known compound.

TEST EXAMPLE 2

Effects of controlling rice Helminthospoium leaf spot:

Rice plants (variety: WASEASAHI), which had been cultivated to the 4 leaves stage in flower pots of 9 cm. in diameter, were dusted by means of a Bell Jar duster with 100 mg per pot of each of test compounds in the form of dusts. After one day, the plants were sprayed and inoculated with a spore suspension of rice Helminthosporium leaf spot fungus (*Cochliobolus miyabeanus*). 3 days thereafter, the number of spots generated was counted to investigate the fungicidal effects of individual test compounds. This test was carried out on different days to obtain the results as set forth in Tables 4 and 5. As is clear from Tables 4 and 5, the present compounds showed markedly excellent effects as compared with the control known compounds.

TABLE 4

| Test compound | Active ingredient concentration (percent) | Number of spots per leaf |
|---|---|---|
| 1-(3,5-dichlorophenyl) hydantoin (C=O–NH, C=O–CH₂) | 3.0 | 2 |
| 1-(3,5-dichlorophenyl)-5-methyl hydantoin (CHCH₃) | 3.0 | 6 |
| 1-(3,5-dichlorophenyl)-5-isobutyl hydantoin (CHCH₂CH(CH₃)₂) | 3.0 | 8 |
| 1-(3,5-dichlorophenyl)-5-(2-methylthioethyl) hydantoin (CHCH₂CH₂SCH₃) | 3.0 | 11 |
| 1-(3,5-dichlorophenyl)-5-benzyl hydantoin (CHCH₂–phenyl) | 3.0 | 5 |
| 1-phenyl hydantoin* | 3.0 | 67 |
| 1-(3,4-dichlorophenyl)-5-methyl hydantoin* | 3.0 | 34 |
| 1-(3-chlorophenyl)-5-methyl hydantoin* | 3.0 | 72 |
| 1-(3,4-dimethoxyphenyl)-5-methyl hydantoin* | 3.0 | 85 |

*Control known compound.

3,668,217

TABLE 4 – Continued

| Test compound | Active ingredient concentration (percent) | Number of spots per leaf |
|---|---|---|
| 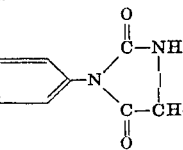 | 3.0 | 76 |
| | 3.0 | 82 |
| | 3.0 | 85 |
| | 3.0 | 69 |
| | 3.0 | 74 |
| | 3.0 | 58 |
| Non-treatment | | 81 |

*Control known compound.

TABLE 5

| Test compound | Active ingredient concentration (percent) | Number of spots per leaf |
|---|---|---|
| 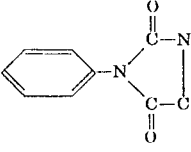 | 2.0 | 0 |
| | 2.0 | 1.3 |
| | 2.0 | 0 |
| | 2.0 | 3.4 |
| 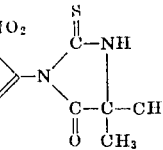 | 2.0 | 0 |
| | 2.0 | 0 |
| | 2.0 | 2.6 |
| | 2.0 | 3.0 |
| | 2.0 | 3.5 |
| | 2.0 | 68.9 |
| 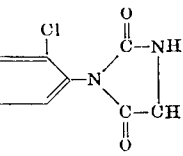 | 2.0 | 56.2 |
| 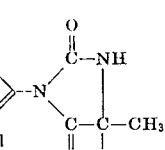 | 2.0 | 67.3 |
| 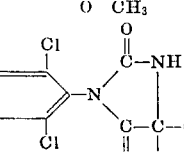 | 2.0 | 70.4 |
| Non-treatment | | 72.8 |

*Control known compound.

TEST EXAMPLE 3

Effects of controlling rice sheath blight:

When rice plants (variety: WASEASAHI), which had been cultivated in flower pots of 9 cm. in diameter reached a height of 50 – 60 cm., the plants were sprayed with 10 ml. per pot of each of aqueous emulsions of test compounds in the form of emulsifiable concentrates. After 3 hours, mycelial pieces disc of 5 cm. in diameter of rice sheath blight fungus (*Pellicularia sasakii*) were inoculated onto the leaf sheaths of individual stems. 5 days thereafter, the size of each diseased spot (region) on the leaf sheaths was measured, and the degree of damage of each stem was calculated to investigate the fungicidal effects of individual test compounds. This test was carried out on different days to obtain the results as set forth in Tables 6 and 7. As is clear from Tables 6 and 7, the resent compounds showed markedly excellent controlling effects as compared with the control known compounds.

The degree of damage was calculated according to the following equation:

$$= \frac{\Sigma(\text{Index of infection} \times \text{Number of stems})}{\text{Number of investigated stems} \times 3} \times 100$$

wherein the index of infection is:

index

0 — No spot was observed on the leaf sheaths.

1 — Spot-like shades were observed on the leaf sheaths. (trace)

2 — Spots of less than 3 cm. in size (length) were observed on the leaf sheaths.

3 — Spots of more than 3 cm. in size were observed on the leaf sheaths.

TABLE 6

| Test compound | Active ingredient concentration (p.p.m.) | Degree of damage |
|---|---|---|
| 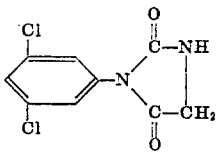 | 200 | 4.2 |
| 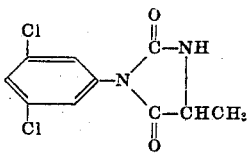 | 200 | 3.8 |
| 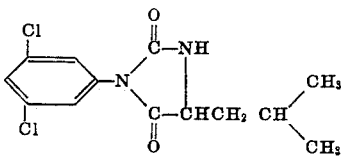 | 200 | 5.8 |
| 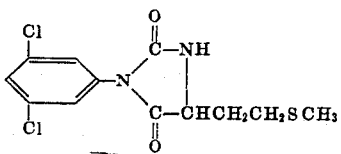 | 200 | 7.6 |
| 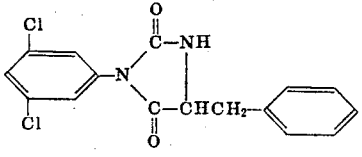 | 200 | 8.9 |
| 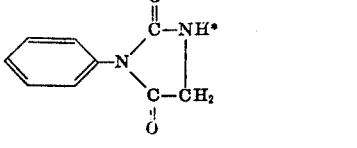 | 200 | 100.0 |
| 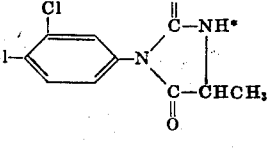 | 200 | 73.2 |
| 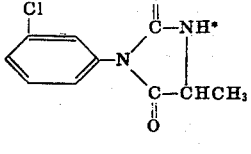 | 200 | 89.1 |

TABLE 6—Continued
| Test compound | Active ingredient concentration (p.p.m.) | Degree of damage |
|---|---|---|
| 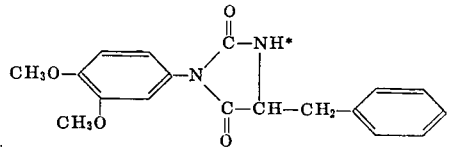 | 200 | 100.0 |
| 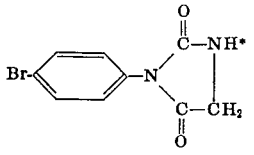 | 200 | 90.1 |
| 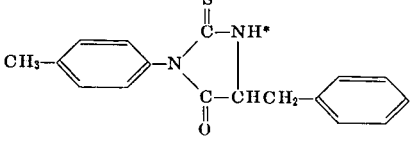 | 200 | 100.0 |
| 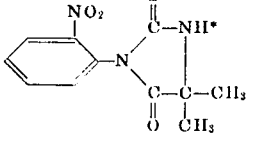 | 200 | 98.1 |
| 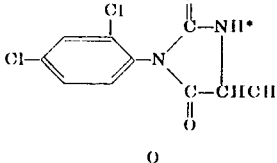 | 200 | 93.4 |
| 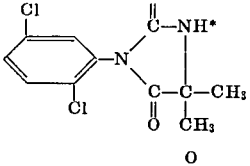 | 200 | 89.2 |
| 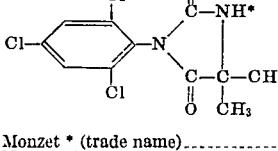 | 200 | 85.6 |
| Monzet * (trade name) | 200 | 6.8 |
| Non-treatment | | 100.0 |
TABLE 7
| Test compound | Active ingredient concentration (p.p.m.) | Degree of damage |
|---|---|---|
| 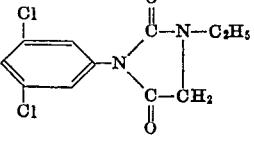 | 500 | 3.3 |
| 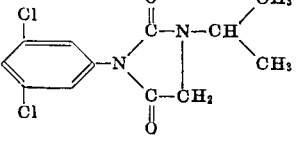 | 500 | 3.9 |

TABLE 7—Continued

| Test compound | Active ingredient concentration (p.p.m.) | Degree of damage |
|---|---|---|
| [3,5-Cl₂-C₆H₃-N(COCH(CH₃)₂)(COCH₃)... structure with Cl, Cl, C(=O)-NH, C-C(CH₃)₂, O, CH₃] | 500 | 0 |
| [C₆H₅-N structure with C(=O)-NH*, C-CH₂, O] | 500 | 100 |
| [Cl, Cl-C₆H₃-N with C(=O)-N-CH(CH₃)₂*, C-CH₂, O] | 500 | 92.8 |
| [C₆H₄(NO₂)-N with C(=O)-NH*, C-C(CH₃)₂, O] | 500 | 100 |
| TUZ* (commercially available fungicide) | 50 | 3.7 |
| Non-treatment | | 100 |

*Control known compound.

TEST EXAMPLE 4

Effects of controlling powdery mildew of cucurbitaceous plants:

When pumpkin plants (variety: HEIAN KOGIKU), which had been cultivated in flower pots of 12 cm. in diameter, reached the 3 – 4 leaves stage, the plants were sprayed with 7 ml. per pot of each of aqueous solutions test compounds in the form of wettable powders. After 1 day, the plants were sprayed and inoculated with a spore suspension of cucurbitaceous powdery mildew fungus (*Sphaerotheca fuliginea*). 10 days thereafter, the infected state of 4 leaves at the upper portion of each plant was observed, and the degree of the damage was calculated from the area of spots (diseased region) generated. In each treatment, 7 pots were used to obtain the results as set forth in Tables 8 and 9. As is clear from Tables 8 and 9, the present compounds showed markedly excellent effects as compared with the control known compounds.

The degree of damage was calculated according to the following equation:

$$\text{Degree of damage} = \frac{\Sigma(\text{Index of infection} \times \text{Number of leaves})}{\text{Number of investigated leaves} \times 5} \times 100$$

TABLE 8

| Test compound | Active ingredient concentration (p.p.m.) | Degree of damage |
|---|---|---|
| [3,5-Cl₂-C₆H₃-N, C(=O)-NH, C-CH₂, O] | 500 | 12.8 |
| [3,5-Cl₂-C₆H₃-N, C(=O)-NH, C-CHCH₃, O] | 500 | 12.4 |
| [3,5-Cl₂-C₆H₃-N, C(=O)-NH, C-CHCH₂CH(CH₃)₂, O] | 500 | 20.6 |
| [3,5-Cl₂-C₆H₃-N, C(=O)-NH, C-CHCH₂CH₂SCH₃, O] | 500 | 25.8 |
| [3,5-Cl₂-C₆H₃-N, C(=O)-NH, C-CHCH₂-C₆H₅, O] | 500 | 22.3 |
| [C₆H₅-N, C(=O)-NH*, C-CH₂, O] | 500 | 60.1 |
| [3-Cl,4-Cl-C₆H₃-N, C(=O)-NH*, C-CHCH₃, O] | 500 | 58.3 |
| [4-Cl-C₆H₄-N, C(=O)-NH*, C-CHCH₃, O] | 500 | 57.2 |
| [3,5-(CH₃O)₂-C₆H₃-N, C(=O)-NH*, C-CH-CH₂, O] | 500 | 62.4 |
| [4-CH₃-C₆H₄-N, C(=S)-NH*, C-CHCH₂, O] | 500 | 63.2 |
| [2-NO₂-C₆H₄-N, C(=S)-NH*, C-C(CH₃)₂, O] | 500 | 58.9 |

TABLE 8 – Continued

| Test compound | Active ingredient concentration (p.p.m.) | Degree of damage |
|---|---|---|
| 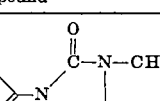 | 500 | 53.2 |
| 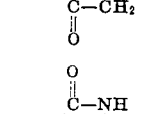 | 500 | 57.6 |
| Non-treatment | | 62.3 |

TABLE 9

| Test compound | Active ingredient concentration (p.p.m.) | Degree of damage |
|---|---|---|
| 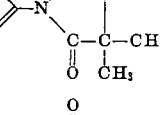 | 500 | 8.1 |
| | 500 | 7.6 |
| | 500 | 9.4 |
| | 500 | 5.2 |

TABLE 9 – Continued

| Test compound | Active ingredient concentration (p.p.m.) | Degree of damage |
|---|---|---|
| 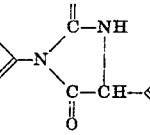 | 500 | 48.3 |
| | 500 | 38.1 |
| | 500 | 45.0 |
| Non-treatment | | 45.5 |

*Control known compounds.

TEST EXAMPLE 5

Effects of controlling cucumber (damping-off):

Flower pots of 9 cm. in diameter were individually packed with farm soil. On the surface of said soil was uniformly spread each 10 ml. of pathogenic soil in which had been cultured and propagated cucumber damping-off fungus (*Pellicularia filamentosa*). To this soil was applied 15 ml. per pot of each of 500 p.p.m. aqueous suspensions of test compounds in the form of emulsifiable concentrates. After 2 hours, 10 seeds per pot of cucumber plant (variety: KAIRYO AODAICHO) were sowed in the soil. 5 Days thereafter, the infected state of the seedlings was investigated to obtain the results as set forth in Tables 10 and 11. As is clear from Tables 10 and 11, the present compounds showed markedly excellent effects.

The percentage of stand set forth in the tables was calculated according to the following equation:

$$\text{Percentage of stand} = \frac{\text{Number of non-infected seedlings in each treated area}}{\text{Number of seedlings germinated in area non-treated and uninoculated}} \times 100$$

TABLE 10

| Test compound | Active ingredient concentration (p.p.m.) | Percentage of stand |
|---|---|---|
| 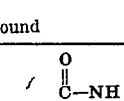 | 500 | 100 |
| 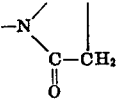 | 500 | 98.0 |

TABLE 10—Continued
| Test compound | Active ingredient concentration (p.p.m.) | Percentage of stand |
|---|---|---|
| 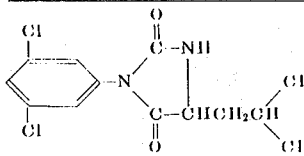 | 500 | 97.6 |
| 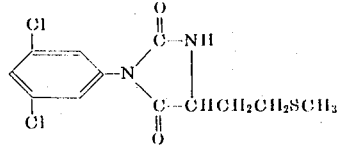 | 500 | 95.3 |
| 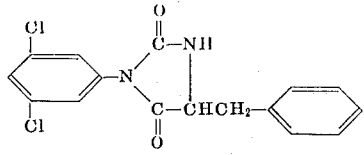 | 500 | 97.2 |
| 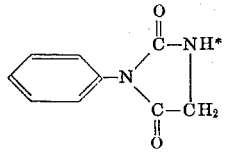 | 500 | 0 |
| 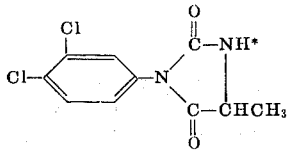 | 500 | 17.6 |
| 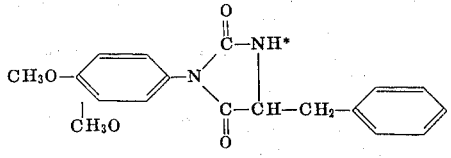 | 500 | 0 |
| 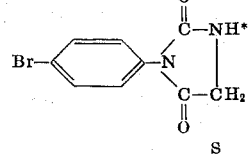 | 500 | 11.3 |
| 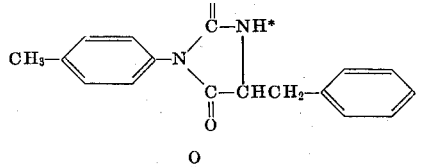 | 500 | 0 |
| 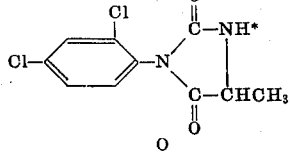 | 500 | 7.4 |
| 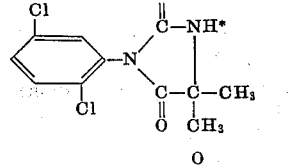 | 500 | 14.1 |
| | 500 | 9.3 |

TABLE 10—Continued

| Test compound | Active ingredient concentration (p.p.m.) | Percentage of stand |
|---|---|---|
| Pentachloronitrobenzene (commercially available fungicide) | 500 | 84.9 |
| Non-treatment (fungus inoculated) | | 0 |
| Non-treatment (uninoculated) | | 100 |

TABLE 11

| Test compound | Active ingredient concentration (p.p.m.) | Percentage of stand |
|---|---|---|
| 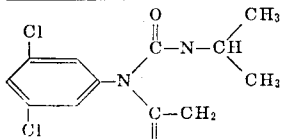 | 500 | 90.1 |
| 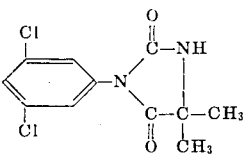 | 500 | 92. |
| 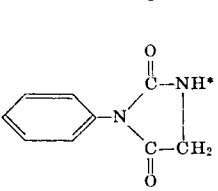 | 500 | 100 |
| 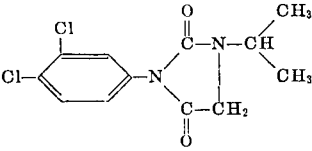 | 500 | 0 |
| 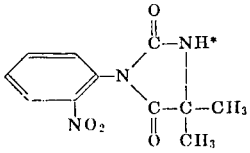 | 500 | 7.5 |
| 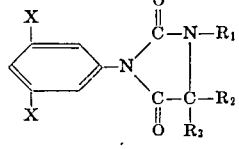 | 500 | 6.6 |
| Pentachloronitrobenzene* (commercially available fungicide) | 500 | 86.4 |
| Non-treatment (fungus inoculated) | | 0 |
| Non-treatment (uninoculated) | | 100 |

\* Control known compounds.

TEST EXAMPLE 6

Anti-microbial spectrum:

According to the agar medium dilution method, the fungus growth-inhibiting effects of 3-(3',5'-dichlorophenyl)-2,4-imidazolidine dione on various plant pathogenic fungi and bacteria were investigated to obtain the results as set forth in Table 12.

TABLE 12

| Test microorganisms | Inhibitory concentration (p.p.m.) |
|---|---|
| Rice blast fungus (*Pyricularia oryzae*) | 200 |
| Rice bacterial leaf blight fungus (*Xanthomonas oryzae*) | 200 |
| Cucumber seedling damping-off fungus (*Pellicularia Filamentosa*) | 40 |
| Peanut southern sclerotium rot fungus (*Corticium rolfsii*) | 200 |
| Strawberry gray mold fungus (*Botrytis cinerea*) | 8 |
| Rape sclerotinia rot fungus (*Sclerotinia sclerotiorum*) | 8 |
| Pear black spot fungus (*Alternaria kikuchiana*) | 40 |
| Apple Alternaria leaf spot fungus (*Alternaria mali*) | 200 |
| Grape ripe rot fungus (*Glomerella cingulata*) | 200 |
| Peach brown rot fungus (*Sclerotinia cinerea*) | 8 |

What is claimed is:

1. A 3-(3',5'-dihalogenophenyl)imidazolidine-2,4-dione derivative represented by the formula,

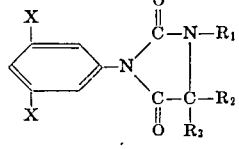

wherein X is halogen; $R_1$ is hydrogen, alkyl of one to five carbon atoms or phenyl; $R_2$ is hydrogen, alkyl of one to six carbon atoms which may be substituted with methylmercapto, phenyl or benzyl; and $R_3$ is hydrogen, alkyl of one to six carbon atoms or phenyl.

2. A 3-(3',5'-dihalogenophenyl)imidazolidine-2,4-dione derivative represented by the formula,

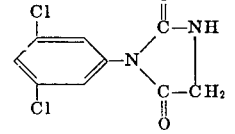

3. A 3-(3',5'-dihalogenophenyl)imidazolidine-2,4-dione derivative represented by the formula,

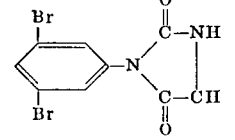

4. A 3-(3',5'-dihalogenophenyl)imidazolidine-2,4-dione derivative represented by the formula,

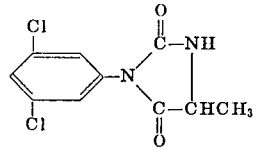

5. A 3-(3',5'-dihalogenophenyl)imidazolidine-2,4-dione derivative represented by the formula,

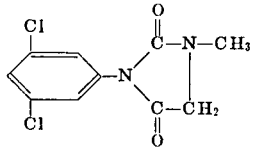

6. A 3-(3′,5′-dihalogenophenyl)imidazolidine-2,4-dione derivative represented by the formula,
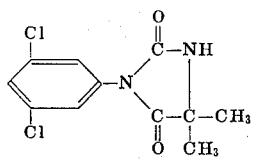
7. A 3-(3′,5′-dihalogenophenyl)imidazolidine-2,4-dione derivative represented by the formula,
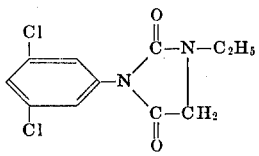
8. A 3-(3′,5′-dihalogenophenyl)imidazolidine-2,4-dione derivative represented by the formula,
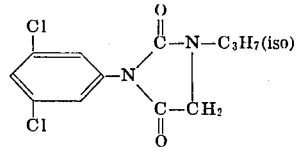
9. A 3-(3′,5′-dihalogenophenyl)imidazolidine-2,4-dione derivative represented by the formula,
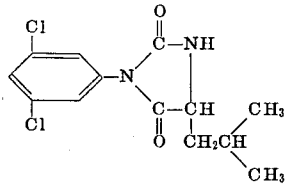
* * * * *